US009916579B1

(12) United States Patent
Watson et al.

(10) Patent No.: US 9,916,579 B1
(45) Date of Patent: Mar. 13, 2018

(54) PROMOTION REDEMPTION AND PAYMENT GATEWAY

(71) Applicant: Groupon, Inc., Chicago, IL (US)

(72) Inventors: Christopher Dwyer Watson, New York, NY (US); Benjamin Pierce McKean, New York, NY (US); Sean Nicholas Harper, Evanston, IL (US); Josh Krall, San Francisco, CA (US); Qi Li, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 14/189,983

(22) Filed: Feb. 25, 2014

(51) Int. Cl.
G06Q 20/38 (2012.01)
G06Q 20/40 (2012.01)
G06Q 20/12 (2012.01)
G06Q 30/02 (2012.01)

(52) U.S. Cl.
CPC ........... G06Q 20/382 (2013.01); G06Q 20/12 (2013.01); G06Q 20/385 (2013.01); G06Q 20/401 (2013.01); G06Q 30/0225 (2013.01)

(58) Field of Classification Search
None
See application file for complete search history.

(56) References Cited

U.S. PATENT DOCUMENTS

| 9,092,777 | B1* | 7/2015 | Gaspar | G06Q 20/385 |
| 2012/0005038 | A1* | 1/2012 | Soman | 705/26.41 |
| 2013/0085835 | A1* | 4/2013 | Horowitz | 705/14.38 |
| 2013/0198851 | A1* | 8/2013 | Spies | H04L 9/0625 726/26 |
| 2013/0254102 | A1* | 9/2013 | Royyuru | 705/39 |
| 2014/0074637 | A1* | 3/2014 | Hammad | 705/21 |
| 2014/0188586 | A1* | 7/2014 | Carpenter | G06Q 30/0222 705/14.23 |
| 2015/0112870 | A1* | 4/2015 | Nagasundaram | G06Q 20/3821 705/67 |

OTHER PUBLICATIONS

U.S. Appl. No. 13/801,610, filed Mar. 13, 2013.
U.S. Appl. No. 13/764,753, filed Feb. 11, 2013.

* cited by examiner

Primary Examiner — John W Hayes
Assistant Examiner — Jason B Fenstermacher
(74) Attorney, Agent, or Firm — Alston & Bird LLP

(57) ABSTRACT

Systems and related methods facilitating secure payments are discussed herein. Some embodiments may provide for a system including a payment gateway server, a tokenizer server and a detokenizer server. The payment gateway server may receive payment card data from a merchant device and provide the payment data the tokenizer server. The tokenizer server may be configured to generate one or more tokens based on the payment data and provide the one or more tokens to the payment gateway server. During payment processing, the payment gateway server may be configured to provide the one or more tokens to the detokenizer server configured to determine the payment data based on the one or more tokens to facilitate completion of a financial transaction. In some embodiments, the one or more tokens may be stored for subsequent payments. Furthermore, some embodiments may provide for secure promotion redemptions in addition or alternative to payments.

24 Claims, 7 Drawing Sheets

PROMOTION REDEMPTION AND PAYMENT GATEWAY

FIELD

Embodiments of the invention relate, generally, to central systems that provide secure payments and promotion redemption services for merchants.

BACKGROUND

Financial transactions between merchants and consumers typically require the consumers to present a form of payment to the merchant. As a result, consumers may be required to keep wallets that include cash, credit cards, debit cards, deal vouchers, coupons, reward tracking cards, checks or other payment instruments that may be accepted by merchants and/or their devices used at the point-of-sale (e.g., point-of-sale devices, such as cash registers, credit card readers, etc.). In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, to facilitate secure and convenient payments and promotion redemptions, such as without requiring a consumer to provide payment data (e.g., a credit card) and/or promotion redemption data (e.g., an instrument such as a voucher or coupon) for each transaction.

Some embodiments may provide for a system including a payment gateway server, a merchant device, a tokenizer server, and a detokenizer server. The merchant device may be configured to: generate transaction data of a financial transaction, the transaction data including payment card data; and provide the transaction data to a tokenizer server. The tokenizer server may be configured to: receive the transaction data including the payment card data from the merchant device; generate secure transaction data based on the transaction data, wherein the secure transaction data includes the transaction data having one or more tokens in place of at least a portion of the payment card data; and provide the secure transaction data to a payment gateway server. The payment gateway server may be configured to: receive the secure transaction data from the tokenizer server; generate secure payment processing data based on the secure transaction data, the secure payment processing data including the one or more tokens; and provide the secure payment processing data to a detokenizer server. The detokenizer server may be configured to: receive the secure payment processing data from the payment gateway server; generate payment processing data based on the secure payment processing data, wherein the payment processing data includes the secure payment processing data including the at least a portion of the payment card data in place the one or more tokens; and provide the payment processing data to a payment processing server. In some embodiments, the tokenizer server, the payment gateway server, the detokenizer server may be comprised of one or more networked devices, such as networked devices of a central system configured to serve a plurality of merchant devices.

In some embodiments, the at least a portion of the payment card data may include one or more of a credit card number and magnetic stripe data.

In some embodiments, the payment gateway server may be further configured to store the secure payment processing data without storing the at least a portion of the payment card data In some embodiments, the transaction data and the secure transaction data may further include one or more of a payment amount, a consumer identifier, a merchant identifier, and an item listing. The secure payment processing data and the payment processing data further may include one or more of a payment amount, a consumer identifier, a payment card expiration date, and transaction metadata.

In some embodiments, the tokenizer server configured to generate the secure transaction data based on the transaction data may include the tokenizer server being configured to generate the one or more tokens based on an algorithmic transformation of the at least a portion of the payment card data.

In some embodiments, the detokenizer server configured to generate the payment processing data based on the secure payment processing data may include the detokenizer server being configured to generate the at least a portion of the payment card data based on an algorithmic transformation of the one or more tokens.

In some embodiments, the system may further include an orders server. The merchant device may be further configured to: generate promotion identifying data of a promotion, the promotion identifying data including an instrument identifier of a redemption instrument; and send the promotion identifying data to the payment gateway server. The payment gateway server may be further configured to: receive the promotion identifying data from the merchant device; send a redemption request including the promotion identifying data to the orders server; and in response to receiving an in indication that the redemption instrument is valid, generate the transaction data including a payment amount that has been reduced by a redemption value of the promotion. The orders server may be configured to: receive the redemption request from the payment gateway server; determine, based on the promotion identifying data, whether the redemption instrument is valid; and in response to determining the redemption instrument is valid, send the indication that the redemption instrument is valid to the payment gateway system.

In some embodiments, the payment gateway server may be further configured to: subsequent to receiving the secure transaction data from the tokenizer server including the one or more tokens, generate a token verification request including the one or more tokens and a merchant identifier; and send the token verification request to the orders server. The orders server may be further configured to: access the secure transaction data; associate a transaction identifier of the financial transaction with the secure transaction data; receive the token verification request from the payment gateway server; in response to receiving the token verification request, determine the transaction identifier based on the one or more tokens and the merchant identifier of the token verification request; and send the transaction identifier to the payment gateway server.

In some embodiments, payment gateway server may be further configured to: receive the transaction identifier from the orders server; and subsequent to receiving the transaction identifier, store the transaction identifier with the one or more tokens for subsequent payment processing.

In some embodiments, the merchant device may be further configured to: determine a consumer identifier and a merchant identifier associated with the financial transaction; and send a request for redeemable promotions including the consumer identifier and the merchant identifier to the orders server. The orders server may be further configured to: determine consumer promotion data indicating one or more redeemable promotions associated with the consumer identifier and the merchant identifier; and send the consumer promotion data to the merchant device.

In some embodiments, the one or more tokens may be associated with a consumer identifier and/or consumer account. The merchant device may be further configured to: determine the consumer identifier based on a wireless communication with a consumer device; and provide the consumer identifier to the payment gateway server. The payment gateway server may be further configured to: determine the one or more tokens based on the consumer identifier; and generate the secure payment processing data including the one or more tokens determined based on the consumer identifier.

In some embodiments, the merchant device may be further configured to: determine the consumer identifier based on a wireless communication with a consumer device; and provide the consumer identifier to the payment gateway server. The payment gateway server may be further configured to: determine a redeemable promotion associated with the consumer identifier; and generate the secure payment processing data including a payment amount that has been reduced by a redemption value of the redeemable promotion; and facilitate redemption of the redeemable promotion.

Some embodiments may provide for a machine-implemented method. The method may include: generating, by a merchant device, transaction data of a financial transaction, the transaction data including payment card data; sending, by the merchant device, the transaction data to a tokenizer server; receiving, by the tokenizer server, the transaction data including the payment card data from the merchant device; generating, by the tokenizer server, secure transaction data based on the transaction data, wherein the secure transaction data includes the transaction data having one or more tokens in place of at least a portion of the payment card data; sending, by the tokenizer server, the secure transaction data to a payment gateway server; receiving, by the payment gateway server, the secure transaction data from the tokenizer server; generating, by the payment gateway server, secure payment processing data based on the secure transaction data, the secure payment processing data including the one or more tokens; sending, by the payment gateway server, the secure payment processing data to a detokenizer server; receiving, by the detokenizer server, the secure payment processing data from the payment gateway server; generating, by the detokenizer server, payment processing data based on the secure payment processing data, wherein the payment processing data includes the secure payment processing data including the at least a portion of the payment card data in place the one or more tokens; and providing, by the detokenizer server, the payment processing data to a payment processing.

In some embodiments, the tokenizer server, the payment gateway server, the detokenizer server are comprised of one or more networked devices.

In some embodiments, the at least a portion of the payment card data includes one or more of a credit card number and magnetic stripe data.

In some embodiments, the method may further include storing, by the payment gateway server, the secure payment processing data without storing the at least a portion of the payment card data.

In some embodiments, the transaction data and the secure transaction data may include one or more of a payment amount, a consumer identifier, a merchant identifier, and an item listing. The secure payment processing data and the payment processing data may include one or more of a payment amount, a consumer identifier, a payment card expiration date, and transaction metadata.

In some embodiments, generating, by the tokenizer server, the secure transaction data based on the transaction data may include the generating the one or more tokens based on an algorithmic transformation of the at least a portion of the payment card data.

In some embodiments, generating, by the detokenizer server, the payment processing data based on the secure payment processing data may include the generating the at least a portion of the payment card data based on an algorithmic transformation of the one or more tokens.

In some embodiments, the method may further include: generating, by the merchant device, promotion identifying data of a promotion, the promotion identifying data including an instrument identifier of a redemption instrument; sending, by the merchant device, the promotion identifying data to the payment gateway server; receiving, by the payment gateway server, the promotion identifying data from the merchant device; sending, by the payment gateway server, a redemption request including the promotion identifying data to an orders server; in response to receiving an in indication that the redemption instrument is valid, generating, by payment gateway server, the transaction data including a payment amount that has been reduced by a redemption value of the promotion; receiving, by the orders server, the redemption request from the payment gateway server; determining, by the orders server and based on the promotion identifying data, whether the redemption instrument is valid; and in response to determining the redemption instrument is valid, sending, by the orders server, the indication that the redemption instrument is valid to the payment gateway system.

In some embodiments, the method may further include: subsequent to receiving the secure transaction data from the tokenizer server including the one or more tokens, generating, by the payment gateway server, a token verification request including the one or more tokens and a merchant identifier; sending, by the payment gateway server, the token verification request to an orders server; accessing, by the orders server, the secure transaction data; associating, by the orders server, a transaction identifier of the financial transaction with the secure transaction data; receiving, by the orders server, the token verification request from the payment gateway server; in response to receiving the token verification request, determining, by the orders server, the transaction identifier based on the one or more tokens and the merchant identifier of the token verification request; and sending, by the orders server, the transaction identifier to the payment gateway server.

In some embodiments, the method may further include: receiving, by the payment server, the transaction identifier from the orders server; and subsequent to receiving the transaction identifier, storing, by the payment server, the transaction identifier with the one or more tokens for subsequent payment processing.

In some embodiments, the method may further include: determining, by the merchant device, a consumer identifier and a merchant identifier associated with the financial transaction; sending, by the merchant device, a request for redeemable promotions including the consumer identifier and the merchant identifier to the orders server; determining, by an orders server, consumer promotion data indicating one or more redeemable promotions associated with the consumer identifier and the merchant identifier; and sending, by the orders server, the consumer promotion data to the merchant device.

In some embodiments, the one or more tokens are associated with a consumer identifier and/or a consumer account. The method may further include: determining, by the merchant device, the consumer identifier based on a wireless communication with a consumer device; providing, by the merchant device, the consumer identifier to the payment gateway server; determining, by the payment gateway server, the one or more tokens based on the consumer identifier; and generating, by the payment gateway server, the secure payment processing data including the one or more tokens determined based on the consumer identifier In some embodiments, the method may further include: determining, by the merchant device, the consumer identifier based on a wireless communication with a consumer device; sending, by the merchant device, the consumer identifier to the payment gateway server; determining, by the payment gateway server, a redeemable promotion associated with the consumer identifier; generating, by the payment gateway server, the secure payment processing data including a payment amount that has been reduced by a redemption value of the redeemable promotion; and facilitating, payment gateway serve, redemption of the redeemable promotion.

These characteristics as well as additional features, functions, and details are described below. Similarly, corresponding and additional embodiments are also described below.

BRIEF DESCRIPTION OF THE DRAWINGS

Figure 1:
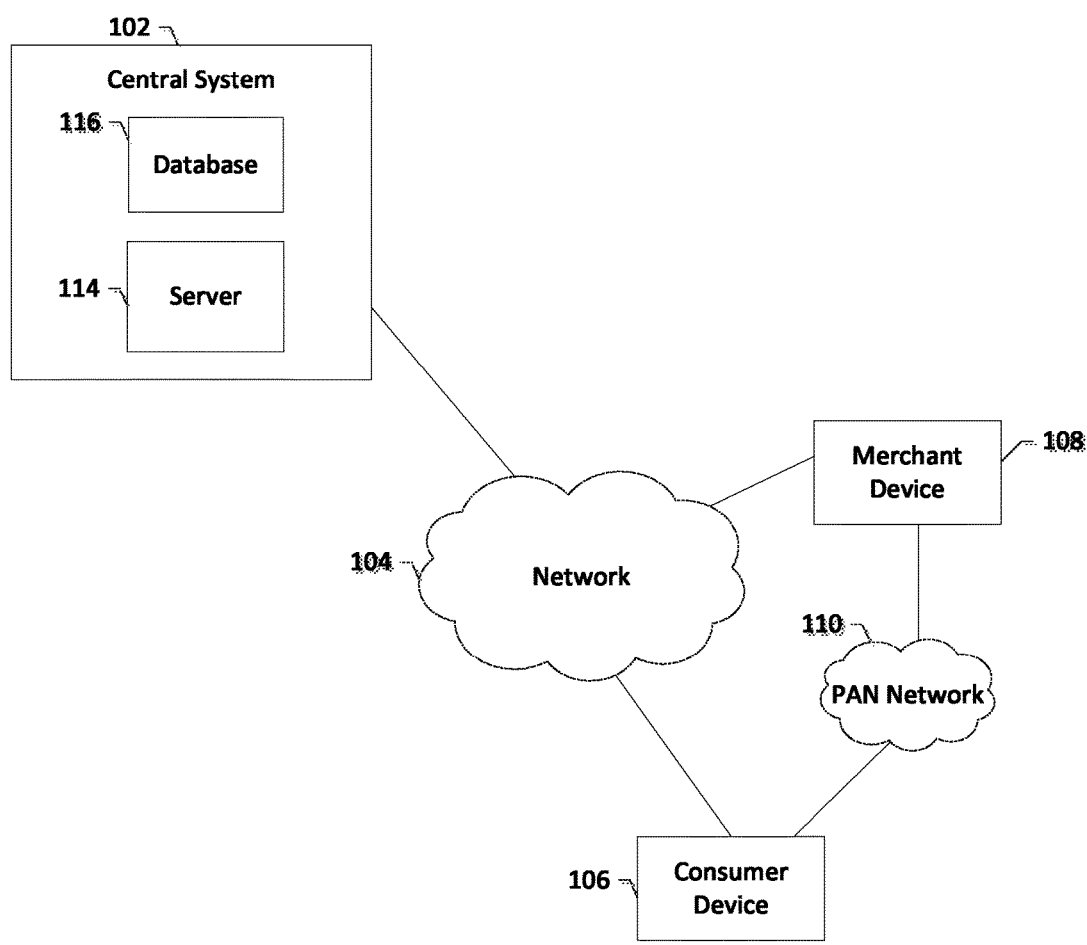
Figure 2:
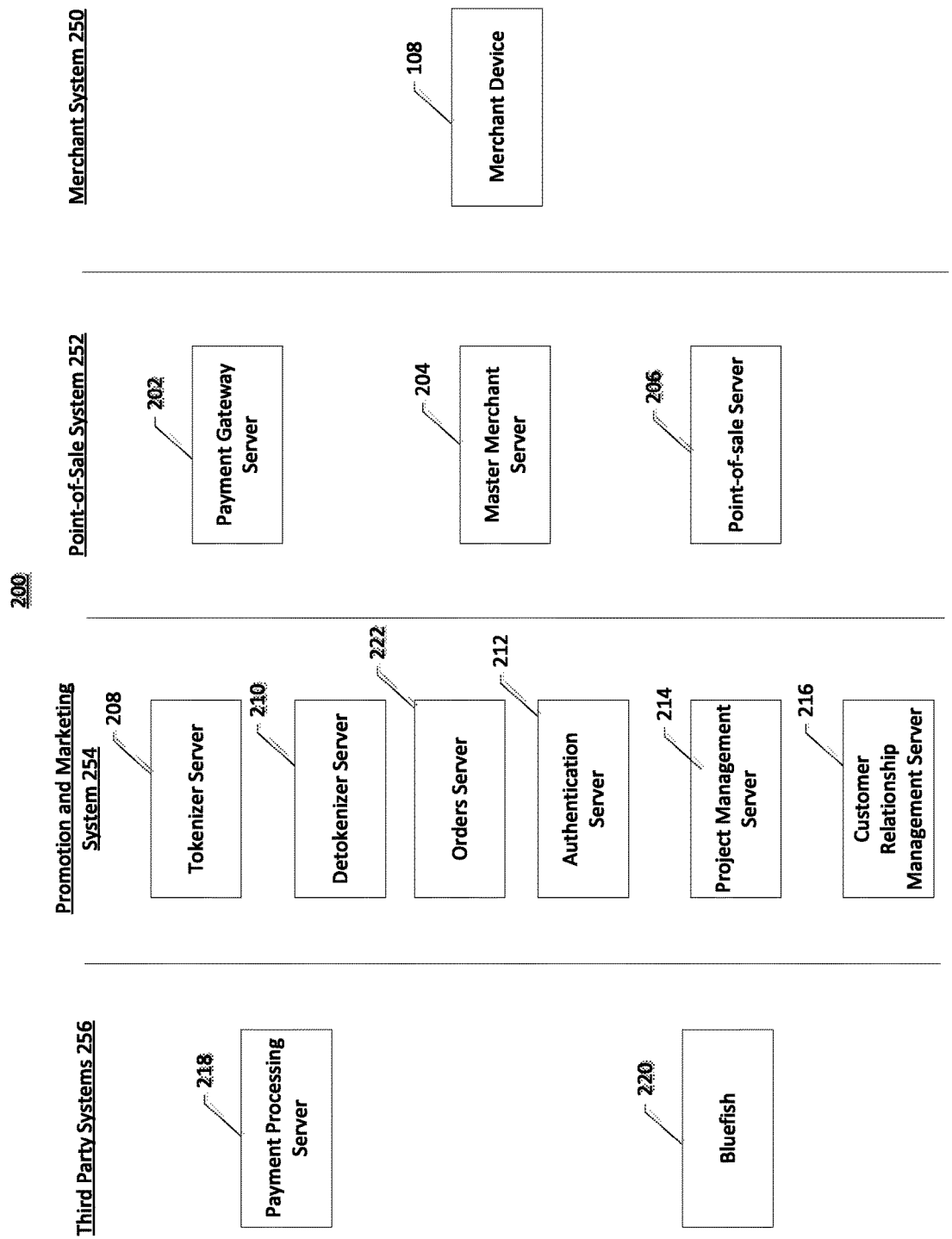
Figure 3:
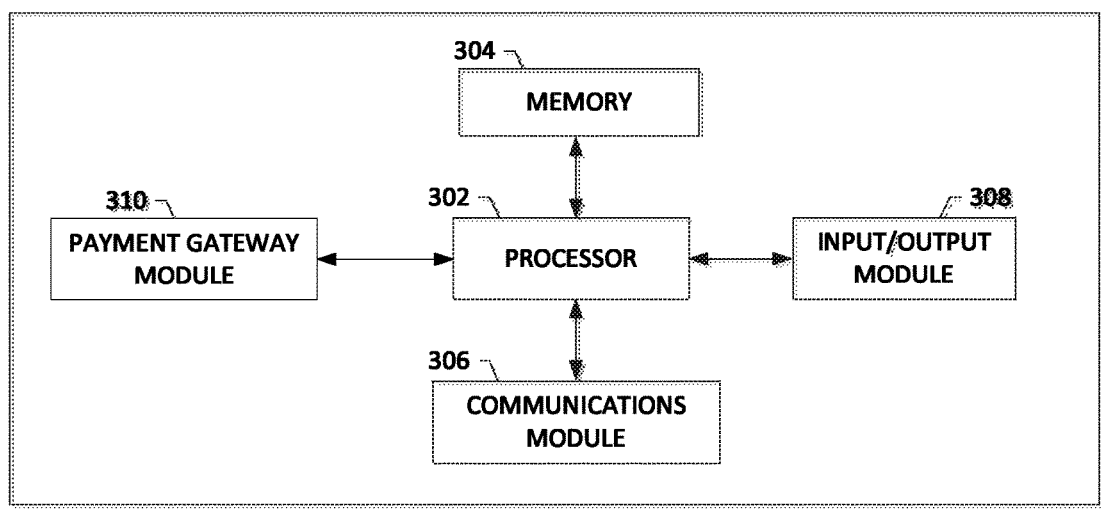
Figure 4:
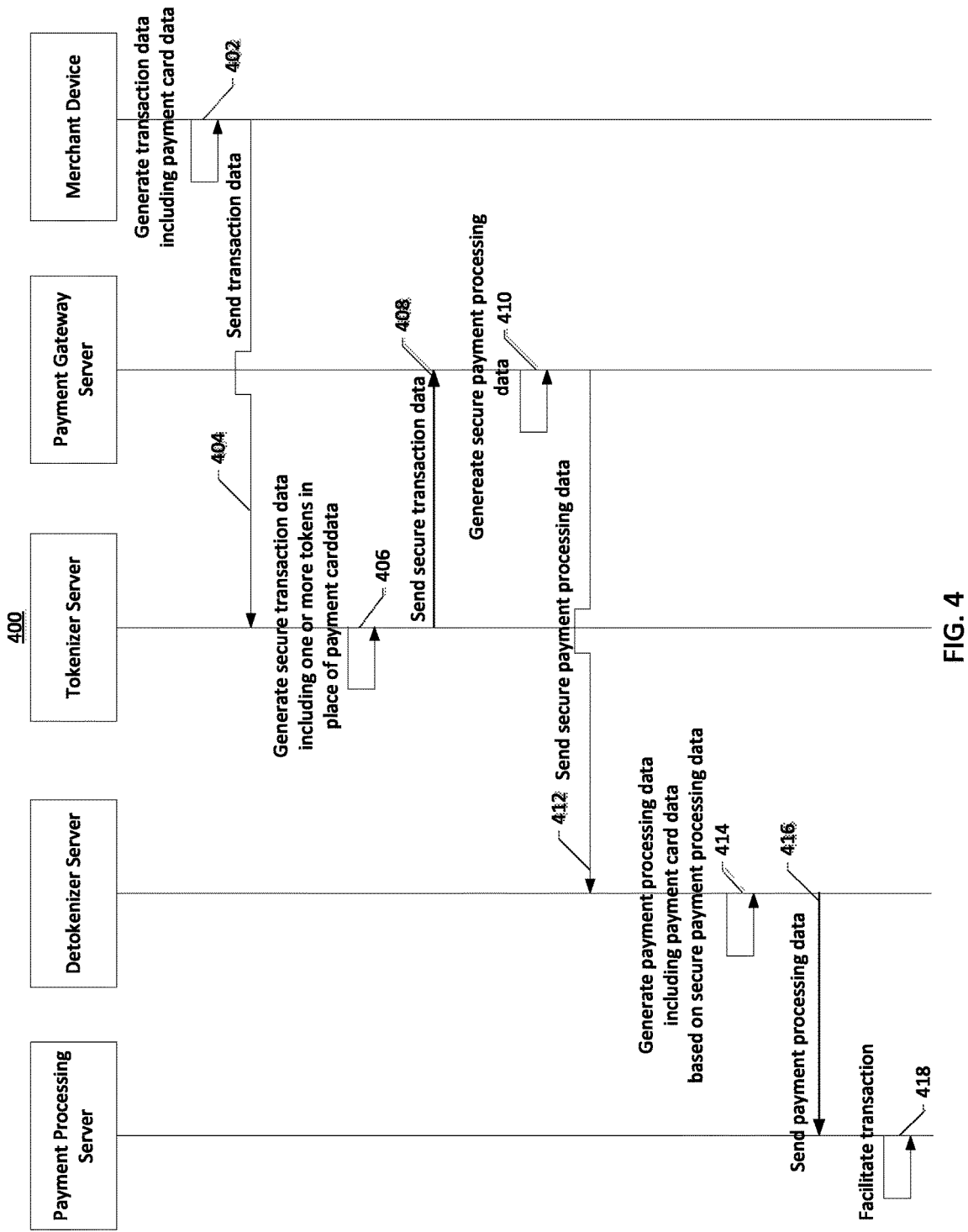
Figure 5:
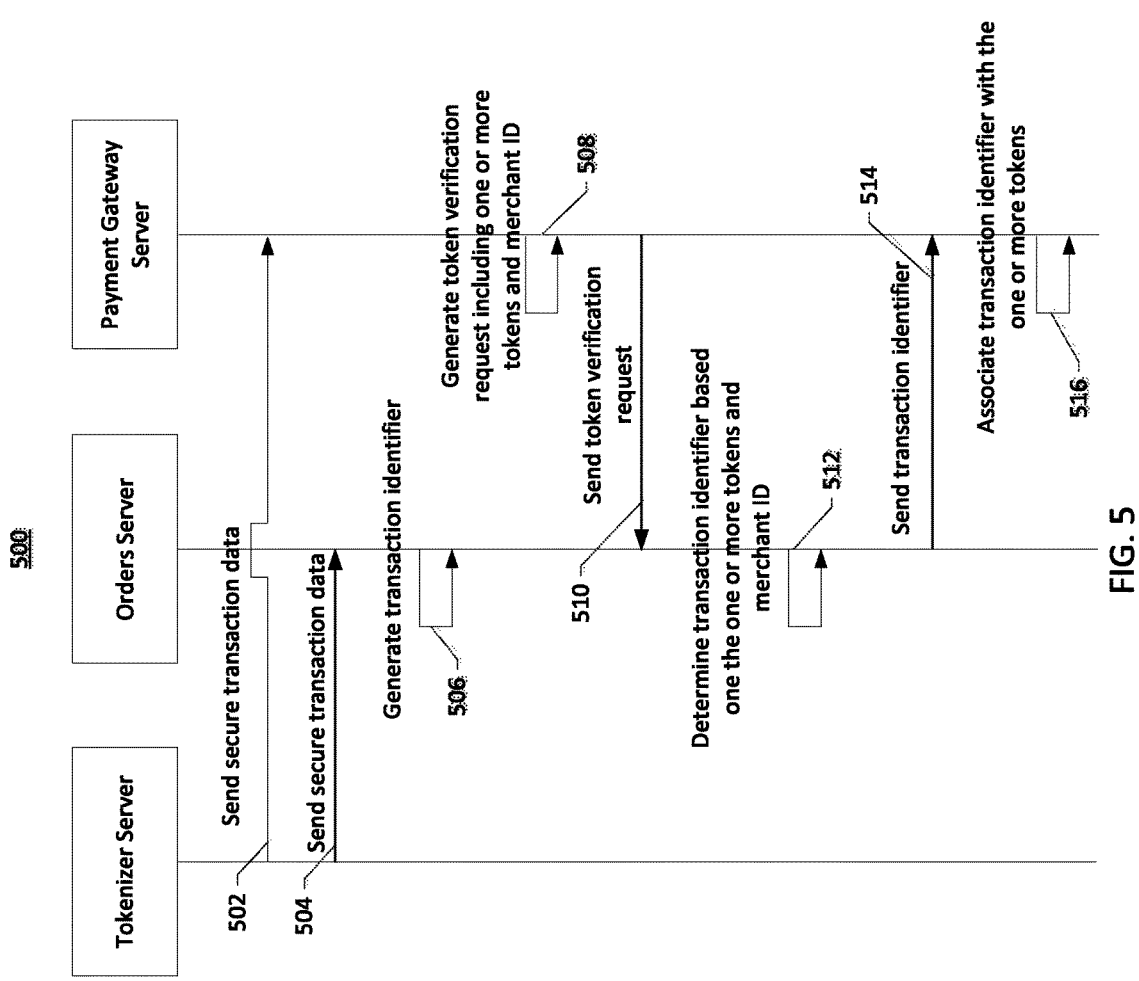
Figure 6:
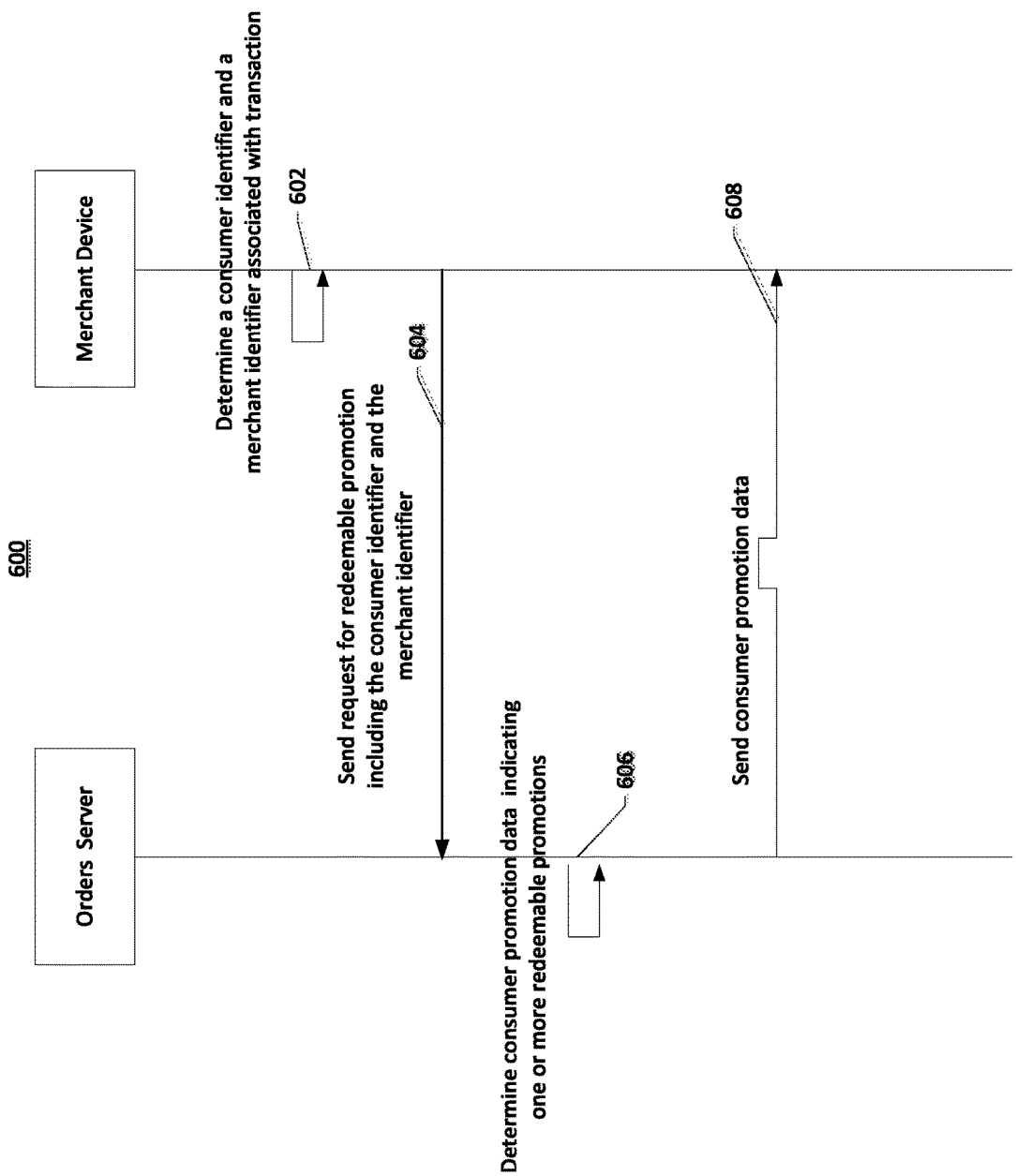
Figure 7:
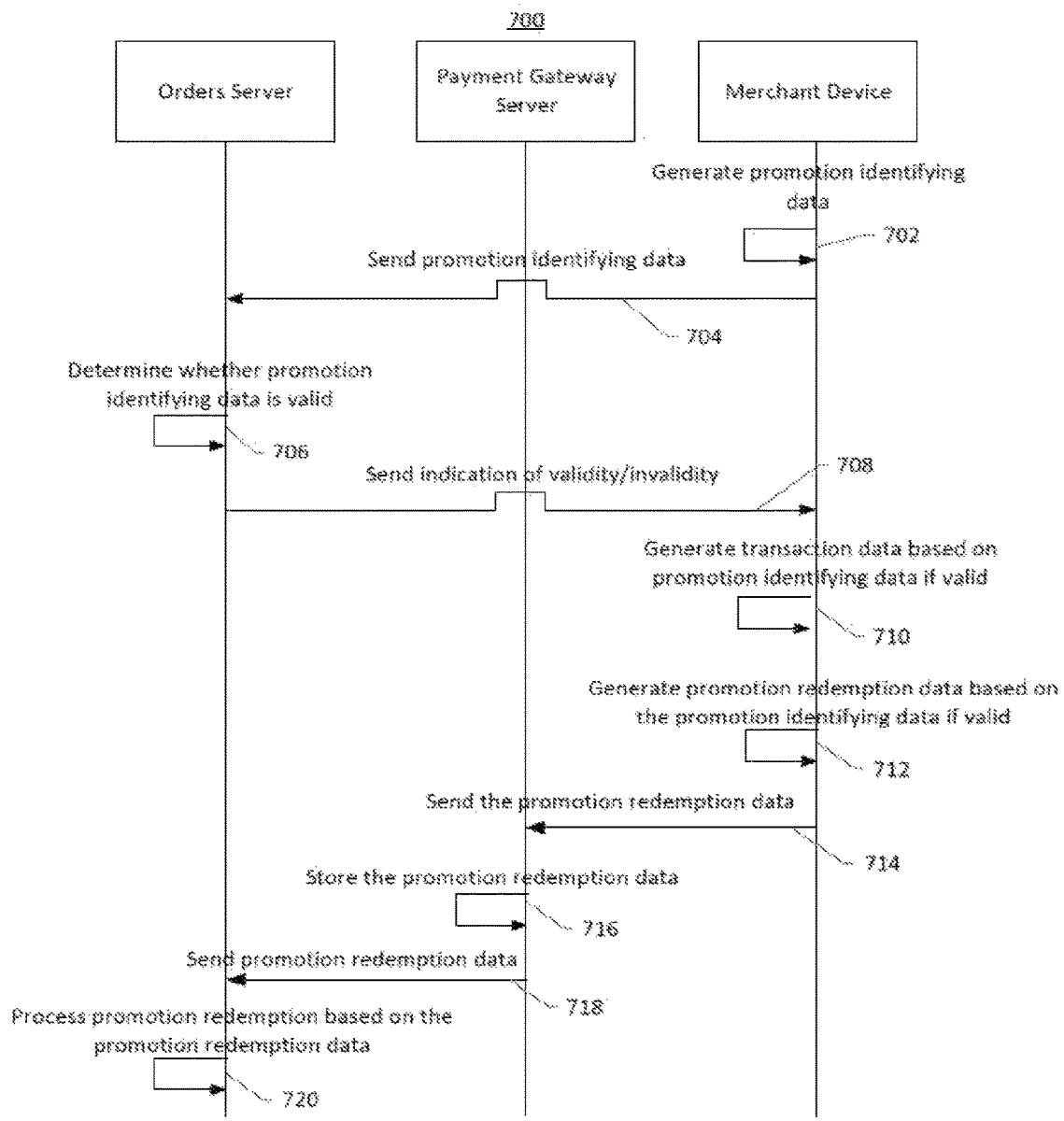

Having thus described some embodiments in general terms, reference will now be made to the accompanying drawings, which are not necessarily drawn to scale, and wherein:

FIG. 1 shows an example of a system in accordance with some embodiments;

FIG. 2 shows an example of a system in accordance with some embodiments;

FIG. 3 shows a schematic block diagram of an example of circuitry in accordance with some embodiments;

FIG. 4 shows an example of a method of facilitating a secure payment in accordance with some embodiments;

FIG. 5 shows an example of a method of determining a transaction identifier in accordance with some embodiments;

FIG. 6 shows an example of a method of determining redeemable promotions of a consumer in accordance with some embodiments; and FIG. 7 shows an example of a method of redeeming a promotion in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

An advantage that may be realized by some embodiments discussed herein is that a central system can provide secure payments and promotion redemptions for consumers, without requiring consumers to provide payment data for each financial transaction. For example, upon receiving payment data (e.g., payment card data such as credit card data, debit card data, financial account data, electronic payment data, etc.) from a consumer device, the system may be configured to generate one or more tokens that may be stored in association with the payment data. The one or more tokens may be stored by a payment gateway server that is responsible for handling financial transactions and promotion redemptions in association with transaction data, such as instead of the payment data. When processing a payment, the one or more tokens may be detokenized to reconstruct and/or otherwise be used to determine the payment data, which may then be provided to a payment processing system to complete one or more financial transactions.

In some embodiments, the one or more tokens may be stored in association with a consumer identifier. The consumer identifier may be used, such as by a consumer device, to make payments rather than requiring the consumer to provide additional instances of payment data. Furthermore, the consumer identifier may be further associated with one or more redeemable promotions of the consumer. The payment gateway server may be configured to facilitate redemption of a promotion in connection with processing a payment, all of which may be completed without the requiring that the consumer provide payment data and/or a promotion redemption instrument.

A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. For example, a promotion may specify that for a $25 accepted value paid by the consumer, the consumer may receive $50 toward a purchase of running shoes at a particular merchant.

A "merchant" or "provider" may include, but is not limited to, a merchant, provider of a promotion, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

An "impression," as used herein, may include a communication, a display, or other perceived indication, such as a flyer, print media, e-mail, text message, application alert, mobile applications, other type of electronic interface or distribution channel and/or the like, of one or more promotions. For example, and using the aforementioned running shoe promotion, an impression may include an e-mail communication sent to consumer devices of consumers that indicates the availability of the $25 for $50 toward running shoes promotion.

An "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience.

Exemplary System Architecture

FIG. 1 shows an example system 100 in accordance with some embodiments. System 100 may include central system 102 (or "system 102"), network 104, consumer device 106, merchant device 108, personal area network (PAN) 110, and third party system 112. System 102 may be communicably connected with consumer device 106 and merchant device 108 via network 104. System 102 may include server 114 and database 116.

Although shown as a single central system 102, as discussed in greater detail with respect to FIG. 2, system 100 may include one or more central systems, each including one or more servers 114 and one or more databases 116. Server 114 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 114 may include several servers performing interconnected and/or distributed functions. To avoid unnecessarily overcomplicating the disclosure, server 114 is shown and described herein as a single server.

Database 116 may be any suitable network storage device configured to store some or all of the information described herein. For example, database 116 may be configured to store consumer information, merchant information, promotion information, and/or among other things. As such, database 116 may include, for example, one or more database systems, backend data servers, network databases, cloud storage devices, etc. To avoid unnecessarily overcomplicating the disclosure, database 116 is shown and described herein as a single database.

In some embodiments, system 102 may be configured to provide a promotion and marketing service, which may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like. In some embodiments, some or all of the data discussed herein that is determined by a merchant device in connection with a payment and/or promotion redemption may be received from a consumer device, such as via PAN network 110 (e.g., a direct wireless connection between the consumer device and merchant device) and/or network 104.

Merchant device 108 may be associated with a merchant, and may be located at a merchant shop and/or other location. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, merchant device 108 may include and/or or may be in communication with one or more dedicated communication beacons. The one or more communication beacons and/or merchant device may be strategically located within a merchant shop to provide a web of consumer device presence detection, communication, and/or location determination (e.g., via received signal strength indication, triangulation, signal time-of-flight determination, etc.). In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102, which may be redeemed with the merchant via merchant device 108, such as in connection with a financial transaction of a transaction session.

In some embodiments, consumer device 106 may connect with merchant device 108 via network 104 and/or PAN network 110. As such, consumer device 106 may be configured to establish a transaction session with merchant device 108 via PAN network 110 even if consumer device 106 and/or merchant device 108 do not have active connections with network 104 and/or central system 102. PAN network 110 may be a wireless communication network utilizing protocols such as Bluetooth, Infrared Data Association (irDA), wireless USB, ZigBee, WiFi, and Z-Wave. However, any other type of connection between the consumer device and merchant device, such as direct wire, Internet, ultra-wideband, near field communications and/or radio frequency identification technologies, may alternatively or additionally be used.

In some embodiments, system 100 may further include one or more third party systems 112, among other things. For example, third party system 112 may be a payment processing server configured to provide for the exchange of money, credits, etc. between the merchant and consumer. In some embodiments, various third party systems 112 may be associated with different types of payment sources. Thus for each payment source, data may be sent to an appropriate third party system (e.g., a credit card transaction server, etc.) to validate and/or process payments.

FIG. 2 shows an example system 200 in accordance with some embodiments. System 200 may include merchant system 250, point-of-sale system 252, promotion and marketing system 254, and third party system 256. Point-of-sale system 252 (or system 252) and promotion and marketing system 254 (or system 254) may be examples of central systems 102 shown in FIG. 1. In some embodiments systems 252 and 254 may part of the same central system and may be comprised of one or more networked machines, apparatuses, servers, etc.

Merchant system 250 may include one or more merchant devices 108, such as a plurality of merchant devices used by a merchant at a merchant shop. Point-of-sale system 252 may be configured to provide point-of-sale functionality to merchant devices. In some embodiments, point-of-sale system 252 may be configured to provide point-of-sale related services to multiple different merchants, each of which may use one or more merchant devices for performing point-of-sale functionality.

Point-of-sale system 252 may include payment gateway server 202, master merchant server 204, and point-of-sale server 206. Payment gateway server 202 may be configured to facilitate payments and promotion redemptions for merchants, as discussed in further detail below. In some embodiments, payment gateway server 202 may be further configured to provide transaction information and/or summaries to merchant device 108 and/or other device accessible to the merchant. Master merchant server 204 may be configured to allow merchants to manage their point-of-sale functionality, such as viewing and updating merchant information such as name, address, tax identification number (TIN), email address, business owner name, contact information, underwriting status, among other things. Point-of-sale server 206 may be configured to provide a point-of-sale functionality, such a providing interfaces and/or data associated with transaction accounts (e.g., tabs, shopping carts, etc.), consumer service, order placement, reservations, consumer seating, ticket printing (e.g., for preparation of menu items, receipts, etc.), among other things. In some embodiments, merchant device 108 may communicate with point-of-sale server 206 to view and update point-of-sale related information such as menus, tax policies, etc.

Promotion and marketing system 254 may be configured to provide promotions of merchants to consumers. For example, system 254 may include orders server 222 configured to provide impressions of promotions to consumers that can be purchased and/or otherwise accepted by the consumers (e.g., via consumer devices). In some embodiments, consumers may create consumer accounts that are hosted by orders server 222 and purchased promotions may be stored as redeemable promotions that can be redeemed at a merchant shop. As discussed in greater detail below, techniques discussed herein may allow a merchant to securely process a payment via a merchant device in connection with promotion redemption. Furthermore, in some embodiments, system 254 may be configured to provide secure payment processing, such as by the tokenizing and detokenizing of payment data, among other things.

System 254 may include tokenizer server 208 and detokenizer server 210. Tokenizer server 208 may be configured to receive payment data (e.g., credit card data such as card number, expiration date, card verification value, etc., debit card data, electronic payment account data, financial account data, among other things) and to generate one or more tokens. The tokens generated by tokenizer server 208 may be generated based on an algorithmic transformation of at least the payment data and/or may be generated independent of the payment data. In that sense, the one or more tokens may be meaningless or otherwise useless when intercepted by an unauthorized device but may be detokenized to recreate the payment data and/or otherwise be securely associated with the payment data within system 254. Detokenizer server 210 may be configured to determine the payment data based on the one or more tokens generated by tokenizer server 208. For example, when the one or more tokens are generated based on an algorithmic transformation of the payment data, detokenizer server 210 may be configured to determine the payment data based on a corresponding algorithmic transformation of the one or more tokens. In another example, detokenizer server 210 may have access to a database in which the one or more tokens are stored in association with the payment data. Here, detokenizer server 210 may be configured to access the database with a query that includes the one or more tokens and may further be configured to receive the payment data in response from the database.

Authentication server 212 may be configured to provide merchant and/or consumer authentication for access to systems 252 and/or 254. For example, each merchant and its merchant data may be associated with a merchant account that may be accessed for various purposes upon providing suitable login data (e.g., identification data such as a username, authentication data such as a password, biometric identifier, and/or among other things). Additionally or alternatively, each consumer and consumer data may be associated with a consumer account that may be accessed (e.g., via a consumer device) upon providing the applicable login data to authentication server 212. In some embodiments, in response to receiving the applicable login data, authentication server 212 may be configured to send an authentication token or an indication of an unsuccessful login (e.g., based on matching the received login data with stored login data in an authentication database).

Project management server 214 and customer relationship management server 216 may be configured to communicate with master merchant server 204 to provide various administrative data to merchant device 108 (e.g., via master merchant server 204). For example, project management server 214 and/or and customer relationship management server 216 may be configured to provide task status tracking (e.g., launching, distributing, executing of products, services, experiences, etc. via system 254), employee time logging, transaction and/or promotion purchase/redemption records, financial account records, merchant hardware purchases (e.g., merchant devices, card readers, etc.), payment transaction volume, among other things.

Third party system 256 may be separate from systems 252 and 254 configured to provide for financial transactions between financial accounts of merchants and consumers. Payment processing server 218 may include one or more servers capable of facilitating and/or otherwise completing a financial transaction such as an automated clearing house server, acquirer serve, card network server, and/or card issuer server. Bluefish server 220 may be in communication with one or more of project management server 214 and/or customer relationship management server 216. In some embodiments, bluefish server 220 may be configured to provide access to one or more remote servers (e.g., project management server 214 and/or customer relationship management server 216) for file access, creation, deletion, modification, etc.

FIG. 3 shows a schematic block diagram of example circuitry 300, some or all of which may be included in system 102, server 114, database 116, consumer device 106, and/or merchant device 108. In accordance with some example embodiments, circuitry 300 may include various means, such as one or more processors 302, memories 304, communications modules 306, and/or input/output modules 308.

In some embodiments, such as when circuitry 300 is included in server 114, payment gateway module 310 may also or instead be included. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments, processor 302 may comprise a plurality of processing means. The plurality of processing means may be embodied on a single computing device or may be distributed across a plurality of computing devices collectively configured to function as circuitry 300. The plurality of processing means may be in operative communication with each other and may be collectively configured to perform one or more functionalities of circuitry 300 as described herein. In an example embodiment, processor 302 may be configured to execute instructions stored in memory 304 or otherwise accessible to processor 302. These instructions, when executed by processor 302, may cause circuitry 300 to perform one or more of the functionalities described herein.

Whether configured by hardware, firmware/software methods, or by a combination thereof, processor 302 may comprise an entity capable of performing operations according to embodiments discussed herein while configured accordingly. Thus, for example, when processor 302 is embodied as an ASIC, FPGA or the like, processor 302 may comprise specifically configured hardware for conducting one or more operations described herein. As another example, when processor 302 may be embodied as an executor of instructions, such as may be stored in memory 304, the instructions may specifically configure processor 302 to perform one or more algorithms, methods or operations described herein. For example, processor 302 may be configured to execute operating system applications, firmware applications, media playback applications, media editing applications, among other things.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing component or distributed across a plurality of computing components. In various embodiments, memory 304 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 304 may be configured to store information, data, applications, instructions, or the like for enabling circuitry 300 to carry out various functions in accordance with example embodiments discussed herein. For example, in at least some embodiments, memory 304 may be configured to buffer input data for processing by processor 302. Additionally or alternatively, in at least some embodiments, memory 304 may be configured to store program instructions for execution by processor 302 and/or data for processing by processor 302. Memory 204 may store information in the form of static and/or dynamic information. This stored information may be stored and/or used by circuitry 200 during the course of performing its functionalities.

Communications module 306 may be embodied as any component or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/software for enabling communications. Communications module 306 may be configured to receive and/or transmit any data that may be stored by memory 304 using any protocol that may be used for communications. Communications module 306 may additionally and/or alternatively be in communication with the memory 304, input/output module 308 and/or any other component of circuitry 300, such as via a bus. Communications module 306 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 308 may be in communication with processor 302 to receive an indication of an input and/or to provide an audible, visual, mechanical, or other output. In that sense, input/output module 308 may include means for performing analog-to-digital and/or digital-to-analog data conversions. Input/output module 308 may include support, for example, for a display, touch screen, keyboard, button, click wheel, mouse, joystick, an image capturing device, microphone, speaker, biometric scanner, and/or other input/output mechanisms. In embodiments where circuitry 300 may be implemented as a server or database, aspects of input/output module 308 may be reduced as compared to embodiments where circuitry 300 may be implemented as an end-user machine or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300. Input/output module 308 may be in communication with memory 304, communications module 306, and/or any other component(s), such as via a bus. Although more than one input/output module and/or other component can be included in circuitry 300, only one is shown in FIG. 3 to avoid overcomplicating the disclosure (e.g., like the other components discussed herein).

In some embodiments, payment gateway module 310 may also or instead be included and configured to perform the functionality discussed herein related to server-side secure payment and promotion redemption processing. In some embodiments, some or all of the functionality of gateway module 310 may be performed by processor 302. In this regard, the example processes and algorithms discussed herein can be performed by at least one processor 302 and/or transaction module 310. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Secure Payment and Promotion Redemption Services

FIG. 4 shows an example of a method 400 of facilitating a secure payment in accordance with some embodiments. Method 400, as well as the other methods discussed herein, is described as being performed by the example structures of FIGS. 1-3. However, other suitable devices, apparatuses, networks, etc. may be used in various embodiments.

Method 400 may begin at 402, where a merchant device may be configured to generate transaction data including payment card data. In some embodiments, the transaction data may include one or more of a transaction amount, a consumer name, a merchant identifier, one or more items associated with the transaction, and payment card data. The payment card data may include credit card information such as card number, expiration date, and card verification value (CVV). Other types of payment cards and/or payment account identifying data may also be used in alternative or addition to the credit card information (e.g., debit card information, financial account information, electronic payment account information, etc.).

In some embodiments, the merchant device may include and/or be in communication with a card reader. The card reader may be configured to read the payment card data from payment card such as through a card swipe, scan, and/or other communication. The card reader may be configured to further provide the payment card data to processing circuitry of the merchant device. Alternatively or additionally, the payment card data may be entered by a merchant, received from a central system (e.g., storing the payment card data in association with a consumer account of the consumer), and/or received from a consumer device.

The merchant identifier, as used herein, refers to a code, value, or other data that uniquely identifies a particular merchant and/or merchant shop. For example, the central systems discussed herein may be configured to provide functionality to a plurality of different merchants that each may be identified via a merchant identifier. The consumer name may be included as part of the payment card data determined from the payment card. Additionally or alternatively, the consumer may be identified based on communication between the merchant device and a consumer device. Additional details regarding consumer identification based on consumer device presence detection, applicable in some embodiments, are discussed in U.S. patent application Ser. No. 13/801,610, titled "Wallet Consumer Presence Based Deal Offers," filed Oct. 17, 2012, which is incorporated by reference herein in its entirety and for all purposes.

At 404, the merchant device may be configured to provide the transaction data to a tokenizer server. For example, merchant device 108 may be configured to provide the transaction data to tokenizer server 208 via network 104. In some embodiments, the transaction data may include one or more the transaction amount, consumer name, merchant identifier, items associated with the transaction, and payment card data as discussed above. In another example, only a portion of the transaction data including the payment card data may be sent to the tokenizer server.

At 406, the tokenizer server may be configured to generate secure transaction data based on the transaction data. For example, the transaction data may include the transaction data having one or more tokens in place of at least a portion of the payment card data. In another example, the secure transaction data may include the one or more tokens. The one or more tokens may include a key, code, among other things and may be based at least in part on a random or pseudorandom data generated by the tokenizer server. In some embodiments, the tokenizer server may be configured to generate the one or more tokens based on an algorithmic transformation of some or portions of the transaction data. In some embodiments, the secure transaction data may include each piece of the transaction data received from the merchant device including the one or more tokens and without including the payment card data.

At 408, the tokenizer server may be configured to send the secure transaction data to a payment gateway server. Tokenizer server 208 and payment gateway server 202 may communicate via network 104, which may include a public network (e.g., the Internet) and/or a private network.

At 410, the payment gateway server may be configured to generate secure payment processing data based on the secure transaction data. The secure payment processing data may include at least a portion of the information needed for interfacing with one or more payment processing server 218. For example, the secure payment processing data may include a payment amount, consumer name, the one or more tokens, the payment card expiration date and/or CVV, and various payment metadata such as a tax amount, tip amount, etc.

At 412, the payment gateway server may be configured to send the secure payment processing data to a detokenizer server. In some embodiments, the payment gateway server may store secure payment processing data for multiple transactions for batch payment processing. For example, secure payment processing data may be sent to the detokenizer server at scheduled times and/or predetermined times, such as on a daily basis. Payment gateway server may store the secure payment processing data including the one or more tokens and without including payment processing data. In that sense, the storage of secure payment processing data may provide security to consumers in that their payment card data cannot be taken from the payment gateway server or the merchant device.

At 414, the detokenizer server may be configured to generate payment processing data based on the secure payment processing data. The payment processing data may include the at least a portion of the secure payment processing data. For example, the payment processing data may include the the payment amount, consumer name, the payment card expiration date and/or CVV, various payment metadata, and the payment data in place of the one or more tokens. In some embodiments, the payment processing data may be of a format that is configured to be compatible with inputs of an applicable payment processing server and/or service.

At 416, the detokenizer server may be configured to send the payment processing data to a payment processing server. For example, detokenizer server 208 may be configured send the payment processing data to payment processing server 218 via network 104.

At 418, the payment processing server may be configured to facilitate a financial transaction based on the payment processing data. For example, the payment processing server may use the payment processing data to complete the financial transaction, which may include communicating with one or more other third party payment processing servers including one or more of an automated clearing house server, acquirer serve, card network server, and/or card issuer server. Method 400 may then end.

FIG. 5 shows an example of a method 500 of determining a transaction identifier in accordance with some embodiments. The transaction identifier may be generated by promotion and marketing system 254 and/or otherwise be used by system 254 to track and/or verify financial transactions and/or promotion redemptions. Method 500 may be performed in connection or subsequent to processing a payment, such as after as prior to the secure payment processing data being sent from the payment gateway server to the detokenizer server at 412 of method 400.

Method 500 may begin at 502, where the tokenizer server may be configured to send secure transaction data to the payment gateway server. The discussion at 408 of method 400 may be applicable at 502.

At 504, the tokenizer server may be configured to send the transaction data to the orders server. For example, tokenizer server 208 may be configured to send the transaction data to orders server via network 104. In some embodiments, the tokenizer server may send the transaction data to a database that is accessible by the orders server. The tokenizer server may be further configured to receive the transaction data from the orders server via the database.

At 506, the orders server may be configured to generate a transaction identifier. The transaction identifier may include and or be based on a value, code or other data that uniquely identifies a particular transaction. In some embodiments, the transaction identifier may be unique for each of the transactions of associated with a particular merchant and/or for a within a predetermined period of time (e.g., daily, monthly, yearly, etc.). The orders server may be further configured to associate the transaction identifier with some or all of the secure transaction data, such as the one or more tokens and/or the merchant identifier. For example, the transaction identifier may be stored in an orders database in association with the one or more tokens and the merchant identifier.

At 508, the payment gateway server may be configured to generate a token verification request. The token verification request may include one or more tokens and a merchant identifier. For example, the payment gateway server may send the one or more tokens received from the tokenizer server at 502 (e.g., including other portions of the secure transaction data or otherwise) to the orders server via network 104. The merchant identifier may be determined based on the transaction data received by the payment gateway server from the merchant device at 402 of method 400.

At 510, the payment gateway server may be configured to send the token verification request to the orders server. For example, payment gateway server 202 may be configured to send the token verification request to orders server 222 via network 104.

At 512, the orders server may be configured to determine the transaction identifier based on the one or more tokens and the merchant identifier. For example, orders server may determine the transaction identifier based on a query within the orders database using the one or more tokens and the merchant identifier.

At 514, the orders server may be configured to send the transaction identifier to the payment gateway server. For example, orders server 222 may be configured to provide the transaction identifier to payment gateway server 202 via network 104.

At 516, the payment gateway server may be configured to associate the transaction with the one or more tokens. For example, the transaction identifier may be associated with the one or more tokens and/or one or more other portions of the secure transaction data received from the tokenizer server at 408 of method 400. In some embodiments, the payment gateway server may be further configured to provide the transaction identifier to the detokenizer server in connection with the secure payment processing data (e.g., at 412 of method 400). Method 500 may then end.

FIG. 6 shows an example of a method 600 of determining redeemable promotions of a consumer in accordance with some embodiments. Method 600 may be performed to facilitate redemption of a promotion of the merchant in connection with a payment, or alternatively, independent of a payment. In some embodiments, method 600 may be performed prior to method 400. For example, the payment amount of the transaction data generated by the merchant device may include a discount that is associated with a redeemed promotion.

Method 600 may begin at 602, where the merchant device may be configured to determine a consumer identifier and a merchant identifier associated with a transaction. The consumer identifier may include a name, key, code or other data that uniquely identifies the consumer and/or an associated consumer account. Where the consumer identifier is a name, for example, it may be determined based on payment card data (e.g., card holder name). In some embodiments, the consumer identifier may include consumer identifying data that is provided to the merchant device from a central system (e.g., orders server 222 and/or authentication server 212) in response to the merchant device sending wallet identifying data (e.g., that does not identify the consumer for unauthorized devices) from a consumer device. Additional details regarding secure wireless determination of a consumer identifier and/or consumer identifying data by a merchant device, applicable in some embodiments, are discussed in U.S. patent application Ser. No. 13/801,610, titled "Wallet Consumer Presence Based Deal Offers," incorporated by reference above, and U.S. patent application Ser. No. 13/754,753, titled "Consumer Device Payment Token Management," filed Mar. 13, 2013, which is incorporated by reference herein in its entirety and for all purposes.

At 604, the merchant device may be configured to send a request for redeemable promotions to the orders server. The request may include the consumer identifier and the merchant identifier. In that sense, the consumer identifier and merchant identifier can be used to determine the redeemable promotions that are applicable to the particular consumer and merchant. For example, merchant device 108 may be configured to provide the request for redeemable promotions purchased and/or otherwise accepted by the consumer that are redeemable at the merchant shop where the merchant device is located.

At 606, the orders server may be configured to determine consumer promotion data indicating one or more redeemable promotions. For example, orders server may be configured to query an orders and/or promotion database that include each redeemable promotion of the consumer and merchant. Orders server may be further configured (e.g., prior to purchase and/or acceptance of a promotion) to provide impressions of promotions to consumer devices for purchase and/or acceptance. When promotion purchase data is received from a consumer device, the promotion purchase data may be stored within the orders and/or promotion database for subsequent retrieval at 606.

At 608, the orders server may be configured to send the consumer promotion data to the merchant device. For example, orders server 222 may be configured to send the consumer promotion data to merchant device 108 via network 104. The merchant device may be further configured to display the consumer promotion data on a display device of the merchant device to facilitate the promotion redemption (e.g., via selection of the applicable redeemable promotion) and/or to send the consumer promotion data to a consumer device (e.g., via PAN network 110). Additionally or alternatively, the orders server may be configured to send the consumer promotion data to the consumer device without passing through the merchant device, such as via network 104.

In some embodiments, in addition to requesting redeemable promotions, the merchant device and/or payment gateway server may be configured to request the one or more tokens associated with payment data. For example, the one or more tokens may include previously stored tokens that are associated with payment data that can be subsequently reused without requiring the consumer to provide another instance of the payment data (e.g., by providing a credit card). Here, rather than providing (e.g., unsecured) transaction data to the tokenizer server at 404, for example, the merchant device may instead be configured to provide secure transaction data including the one or more tokens directly to the payment gateway server. In another example, rather than receive the secure transaction data at 408 including the one or more tokens from the tokenizer server, the payment gateway server may be configured to generate the secure transaction data based on receiving the unsecured transaction data from the merchant device and sending a request for the one or more tokens (e.g., the request including the consumer and/or merchant identifiers that can serve as a reference for token lookup by the orders server). Method 600 may then end.

FIG. 7 shows an example of a method 700 of redeeming a promotion in accordance with some embodiments. Method 700 may be performed subsequent to method 600 when the redeemable promotions are determined and prior to method 400. In some embodiments, method 700 may alternatively or additionally be performed in connection with a consumer presenting an instrument to the merchant, as discussed in greater detail below.

Method 700 may begin at 702, where the merchant device may be configured to generate promotion identifying data. The promotion identifying data may indicate a particular promotion and/or consumer intent to redeem one or more redeemable promotions. In that sense, the promotion identifying data may be generated based on the consumer promotion data received from the orders server and/or as selected by a merchant on the merchant device. Alternatively or additionally, the promotion identifying data may be determined based on an instrument received from the consumer. For example, where the instrument is a paper or electronic coupon (e.g., displayed on a consumer device) including a barcode, the merchant device may include a barcode scanner configured to read the promotion identifying data (e.g., barcode data that identifies the instrument and/or promotion) from the instrument. In another example, the promotion identifying data may be manually entered by a merchant on a user input device of the merchant device. In yet another example, the promotion identifying data may be sent from the consumer device to the merchant device, such as via network 104 and/or PAN network 110.

At 704, the merchant device may be configured to send the promotion identifying data to the orders server. For example, merchant device 108 may be configured to send the promotion identifying data via network 104 to orders server 222. In some embodiments, the promotion identifying data may include a promotion identifier that identifies the promotion, an instrument identifier that identifies a particular instrument of the promotion, a consumer identifier and/or a merchant identifier.

At 706, the orders server may be configured to determine whether the promotion identifying data is valid. For example, orders server may be configured to query an orders database using the promotion identifying data. Each purchased promotion within the orders database may be associated with a status indicating whether the promotion has been redeemed, a redemption expiration date, etc.

At 708, the orders server may be configured to send an indication of whether the promotion identifying data is valid (and/or invalid) to the merchant device. For example, in response to determining based on the promotion identifying data is associated with a promotion that has expired, has already been redeemed, and/or is otherwise unredeemable, the orders server may be configured to determine that the promotion identifying data as invalid. In response to determining that the promotion identifying data is associated with a promotion that has failed to expire, has not been redeemed, or is otherwise redeemable, the orders server may be configured to determine the promotion identifying data as valid. The orders server may be further configured to provide the suitable indication to the merchant device, such as via network 110.

At 710, the merchant device may be configured to generate transaction data based on the promotion identifying data if the promotion identifying data is valid. The discussion at 402 of method 400 may be applicable at 710. For example, the payment data portion of the transaction data may include a total cost (e.g., determined by the individual costs associated with each item in the transaction, a tip amount, a tax amount, service fees, etc.) reduced by a discount value of a redeemable promotion. In some embodiments, the discount value of the redemption may be determined by the merchant device based on a communication with the orders server (e.g., at 708) and/or based on the promotion identifying data (e.g., as determined at 702).

At 712, the merchant device may be configured to generate promotion redemption data based on the promotion identifying data being valid. For example the promotion redemption data may include a promotion identifier and/or an instrument identifier. The merchant device may be configured to further determine whether the consumer wants to redeem the redeemable promotion and generate the promotion redemption data in response to receiving an indication of consumer intent to redeem the redeemable promotion.

At 714, the merchant device may be configured to send the promotion redemption data to the payment gateway server. For example, merchant device 108 may be configured to provide the promotion redemption data to payment gateway server 202 via network 104. In some embodiments, the promotion redemption data may be included with and/or otherwise provided in connection with the transaction data sent to the payment gateway server at 402 of method 400.

At 716, the payment gateway server may be configured to store the promotion redemption data. For example, the promotion redemption data may be stored with and/or in connection with the secure payment processing generated by the payment gateway server at 410 of method 400, such as for subsequent batch processing.

At 718, the payment gateway server may be configured to send the promotion redemption data to the orders server. For example, the payment processing data may be sent by payment gateway server 202 to orders server 222 via network 104. In some embodiments, the payment gateway server may be configured to generate and send the promotion redemption data in a format that is configured to be compatible with inputs of the orders server.

At 720, the orders server may be configured to process the redemption of the promotion based on the promotion redemption data. For example, the applicable promotion and/or instrument may be identified based on the promotion redemption data. The orders server may be configured to modify the status of the promotion from unredeemed to redeem such that subsequent redemption in unavailable. In some embodiments, the order server may be additionally configured to provide a discount amount of the redeemed promotion to the merchant device and/or payment gateway server. Method 700 may then end.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the payment server. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
a merchant device;
a tokenizer server;
a payment gateway server;
a detokenizer server;
an orders server; and
a payment processing server;
the merchant device is located at a merchant location, the merchant device is configured to:
generate transaction data of a financial transaction, the transaction data including payment card data; and
provide, via a network, the transaction data to the tokenizer server;
the tokenizer server, configured to:
receive the transaction data including the payment card data from the merchant device;
generate secure transaction data based on the transaction data, wherein the secure transaction data includes the transaction data having one or more tokens in place of at least a portion of the payment card data; and
provide, via the network, the secure transaction data to the payment gateway server and the orders server;
the payment gateway server is distinct from the merchant device, the payment gateway server is configured to:
receive, via the network, the secure transaction data from the tokenizer server;
generate secure payment processing data based on the secure transaction data, the secure payment processing data including the one or more tokens;
store the secure payment processing data without storing the at least a portion of the payment card data;
provide the secure payment processing data to a detokenizer server;
generate a token verification request including the one or more tokens;
send the token verification request to the orders server;
the orders server is configured to:
receive, from the tokenizer server, the secure transaction data;
generate, based on the secure transaction, a transaction identifier, wherein the transaction identifier comprises data that is utilized to verify and track the financial transaction;
associate the transaction identifier with the secure transaction data;
in response to receiving the token verification requests from the payment gateway server, determine the transaction identifier based on the one or more tokens in the token verification request; and
send the transaction identifier to the payment gateway server; and
the detokenizer server configured to:
receive the secure payment processing data from the payment gateway server;
generate payment processing data based on the secure payment processing data, wherein the payment processing data includes the secure payment processing data including the at least a portion of the payment card data in place the one or more tokens; and
provide the payment processing data to the payment processing server.

2. The system of claim 1, wherein the tokenizer server, the payment gateway server, the detokenizer server are comprised of one or more networked devices.

3. The system of claim 1, wherein the at least a portion of the payment card data includes one or more of a credit card number and magnetic stripe data.

4. The system of claim 1, wherein:
the transaction data and the secure transaction data further includes one or more of a payment amount, a consumer identifier, a merchant identifier, and an item listing; and
the secure payment processing data and the payment processing data further includes one or more of a payment amount, a consumer identifier, a payment card expiration date, and transaction metadata.

5. The system of claim 1, wherein the tokenizer server configured to generate the secure transaction data based on the transaction data includes the tokenizer server being configured to generate the one or more tokens based on an algorithmic transformation of the at least a portion of the payment card data.

6. The system of claim 1, wherein the detokenizer server configured to generate the payment processing data based on the secure payment processing data includes the detokenizer server being configured to generate the at least a portion of the payment card data based on an algorithmic transformation of the one or more tokens.

7. The system of claim 1 wherein:
the merchant device is further configured to:
generate promotion identifying data of a promotion, the promotion identifying data including an instrument identifier of a redemption instrument; and
send the promotion identifying data to the payment gateway server; and
the payment gateway server is further configured to:
receive the promotion identifying data from the merchant device;
send a redemption request including the promotion identifying data to the orders server; and in response to receiving an in indication that the redemption instrument is valid, generate the transaction data including a payment amount that has been reduced by a redemption value of the promotion; and the orders server configured to:
receive the redemption request from the payment gateway server;
determine, based on the promotion identifying data, whether the redemption instrument is valid; and
in response to determining the redemption instrument is valid, send the indication that the redemption instrument is valid to the payment gateway system.

8. The system of claim 1, wherein the payment gateway server is further configured to:
receive the transaction identifier from the orders server; and
subsequent to receiving the transaction identifier, store the transaction identifier with the one or more tokens for subsequent payment processing.

9. The system of claim 1 wherein:
the merchant device is further configured to:
determine a consumer identifier and a merchant identifier associated with the financial transaction; and
send a request for redeemable promotions including the consumer identifier and the merchant identifier to the orders server; and
the orders server is further configured to:
determine consumer promotion data indicating one or more redeemable promotions associated with the consumer identifier and the merchant identifier; and
send the consumer promotion data to the merchant device.

10. The system of claim 1, wherein:
the one or more tokens are associated with a consumer identifier;
the merchant device is further configured to:
determine the consumer identifier based on a wireless communication with a consumer device; and
provide the consumer identifier to the payment gateway server; and
the payment gateway server is further configured to:
determine the one or more tokens based on the consumer identifier; and
generate the secure payment processing data including the one or more tokens determined based on the consumer identifier.

11. The system of claim 1, wherein:
the one or more tokens are associated with a consumer identifier;
the merchant device is further configured to:
determine the consumer identifier based on a wireless communication with a consumer device; and
provide the consumer identifier to the payment gateway server; and
the payment gateway server is further configured to:
determine a redeemable promotion associated with the consumer identifier; and
generate the secure payment processing data including a payment amount that has been reduced by a redemption value of the redeemable promotion; and
facilitate redemption of the redeemable promotion.

12. The system of claim 1, further comprising a promotion and marketing system wherein the promotion and marketing system comprises the tokenizer server, the detokenizer server, and the orders server and the promotion and marketing system is a single networked device.

13. The system of claim 12, wherein the promotion and marketing system further comprises the payment processing server.

14. A machine-implemented method, comprising:
generating, by a merchant device at a merchant location, transaction data of a financial transaction, the transaction data including payment card data;
sending, by the merchant device, the transaction data to a tokenizer server;
receiving, by the tokenizer server, the transaction data including the payment card data from the merchant device;
generating, by the tokenizer server, secure transaction data based on the transaction data, wherein the secure transaction data includes the transaction data having one or more tokens in place of at least a portion of the payment card data;
sending, by the tokenizer server, the secure transaction data to an orders server and a payment gateway server, wherein the payment gateway server is distinct from the merchant device;
receiving, by the payment gateway server, the secure transaction data from the tokenizer server;
generating, by the payment gateway server, secure payment processing data based on the secure transaction data, the secure payment processing data including the one or more tokens;
storing, by the payment gateway server, the secure payment processing data without storing the at least a portion of the payment card data;
sending, by the payment gateway server, the secure payment processing data to a detokenizer server;
generating, by the payment gateway server, a token verification request including the one or more tokens;
sending, by the payment gateway server, the token verification request to an orders server;
receiving, by the orders server, from the tokenizer server, the secure transaction data;
generating, by the orders server, based on the secure transaction, a transaction identifier, wherein the transaction identifier comprises data that is utilized to verify and track the financial transaction;
associating, by the orders server, the transaction identifier with the secure transaction data;
in response to receiving the token verification requests from the payment gateway server, determining by the orders server, the transaction identifier based on the one or more tokens in the token verification request
sending, by the orders server, the transaction identifier to the payment gateway server;
receiving, by the detokenizer server, the secure payment processing data from the payment gateway server;
generating, by the detokenizer server, payment processing data based on the secure payment processing data, wherein the payment processing data includes the secure payment processing data including the at least a portion of the payment card data in place the one or more tokens; and
providing, by the detokenizer server, the payment processing data to a payment processing server.

15. The method of claim 14, wherein the tokenizer server, the payment gateway server, the detokenizer server are comprised of one or more networked devices.

16. The method of claim 14, wherein the at least a portion of the payment card data includes one or more of a credit card number and magnetic stripe data.

17. The method of claim 14, wherein:
- the transaction data and the secure transaction data further includes one or more of a payment amount, a consumer identifier, a merchant identifier, and an item listing; and
- the secure payment processing data and the payment processing data further includes one or more of a payment amount, a consumer identifier, a payment card expiration date, and transaction metadata.

18. The method of claim 14, wherein generating, by the tokenizer server, the secure transaction data based on the transaction data includes the generating the one or more tokens based on an algorithmic transformation of the at least a portion of the payment card data.

19. The method of claim 14, wherein generating, by the detokenizer server, the payment processing data based on the secure payment processing data includes the generating the at least a portion of the payment card data based on an algorithmic transformation of the one or more tokens.

20. The method of claim 14 further comprising:
- generating, by the merchant device, promotion identifying data of a promotion, the promotion identifying data including an instrument identifier of a redemption instrument;
- sending, by the merchant device, the promotion identifying data to the payment gateway server;
- receiving, by the payment gateway server, the promotion identifying data from the merchant device;
- sending, by the payment gateway server, a redemption request including the promotion identifying data to the orders server;
- in response to receiving an in indication that the redemption instrument is valid, generating, by payment gateway server, the transaction data including a payment amount that has been reduced by a redemption value of the promotion;
- receiving, by the orders server, the redemption request from the payment gateway server;
- determining, by the orders server and based on the promotion identifying data, whether the redemption instrument is valid; and
- in response to determining the redemption instrument is valid, sending, by the orders server, the indication that the redemption instrument is valid to the payment gateway system.

21. The method of claim 14 further comprising:
- receiving, by the payment server, the transaction identifier from the orders server; and
- subsequent to receiving the transaction identifier, storing, by the payment server, the transaction identifier with the one or more tokens for subsequent payment processing.

22. The method of claim 14 further comprising:
- determining, by the merchant device, a consumer identifier and a merchant identifier associated with the financial transaction;
- sending, by the merchant device, a request for redeemable promotions including the consumer identifier and the merchant identifier to the orders server;
- determining, by an orders server, consumer promotion data indicating one or more redeemable promotions associated with the consumer identifier and the merchant identifier; and
- sending, by the orders server, the consumer promotion data to the merchant device.

23. The method of claim 14, wherein the one or more tokens are associated with a consumer identifier and further comprising:
- determining, by the merchant device, the consumer identifier based on a wireless communication with a consumer device;
- providing, by the merchant device, the consumer identifier to the payment gateway server;
- determining, by the payment gateway server, the one or more tokens based on the consumer identifier; and
- generating, by the payment gateway server, the secure payment processing data including the one or more tokens determined based on the consumer identifier.

24. The method of claim 14, wherein the one or more tokens are associated with a consumer identifier and further comprising:
- determining, by the merchant device, the consumer identifier based on a wireless communication with a consumer device;
- sending, by the merchant device, the consumer identifier to the payment gateway server;
- determining, by the payment gateway server, a redeemable promotion associated with the consumer identifier;
- generating, by the payment gateway server, the secure payment processing data including a payment amount that has been reduced by a redemption value of the redeemable promotion; and
- facilitating, payment gateway server, redemption of the redeemable promotion.

\* \* \* \* \*